United States Patent
Klatsky et al.

(10) Patent No.: US 10,375,027 B2
(45) Date of Patent: Aug. 6, 2019

(54) PROVISIONING USING A GENERIC CONFIGURATION

(71) Applicant: Comcast Cable Communications, LLC, Philadelphia, PA (US)

(72) Inventors: Carl Klatsky, Yardley, PA (US); Chris Wendt, Exton, PA (US); Manoj Chaudhari, Marlton, NJ (US); Christopher Zarcone, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/298,877

(22) Filed: Oct. 20, 2016

(65) Prior Publication Data
US 2017/0171160 A1 Jun. 15, 2017

Related U.S. Application Data

(63) Continuation of application No. 13/087,597, filed on Apr. 15, 2011, now Pat. No. 9,509,513.

(51) Int. Cl.
*H04L 29/06* (2006.01)
*H01L 29/12* (2006.01)
(Continued)

(52) U.S. Cl.
CPC ........ *H04L 63/0281* (2013.01); *H04L 9/3226* (2013.01); *H04L 9/3239* (2013.01);
(Continued)

(58) Field of Classification Search
CPC ............... H04L 63/101; H04L 63/0876; H04L 63/0281; H04L 9/3226; H04L 9/3239;
(Continued)

(56) References Cited

U.S. PATENT DOCUMENTS

2002/0103009 A1  8/2002  Sato
2005/0273848 A1*  12/2005  Charles ............... H04L 63/0807
726/11
(Continued)

OTHER PUBLICATIONS

PacketCable(TM) 1.5 Specification: MTA Device Provisioning PKT-SP-PROV1.5-I04-090624. Released Jun. 24, 2009; (C)2004-2009 Cable Television Labs Inc. (114 pages total) http://www.cable-europe.eu/wp-content/uploads/bsk-pdf-manager/60_PKT-SP-PROV1.5-I04-090624.PDF.*

(Continued)

*Primary Examiner* — Joseph P Hirl
*Assistant Examiner* — Thomas A Gyorfi
(74) *Attorney, Agent, or Firm* — BakerHostetler

(57) ABSTRACT

An apparatus, method, system and computer-readable medium are provided for provisioning a user equipment device (UED). The UED may be configured to receive a generic configuration and (dynamically) derive settings specific to the UED that would otherwise have been received in the configuration. The UED may execute one or more applications to derive the settings specific to the UED. A first application may enable the UED to dynamically learn a fully qualified domain name (FQDN) and IP address of a node. A second application may enable the UED to generate authentication credentials for the UED. A third application may enable the UED to determine a port or ports that are authorized for service and a port or ports that are not authorized for service. A fourth application may enable the UED to determine a number associated with the UED.

20 Claims, 4 Drawing Sheets

(51) Int. Cl.
  *H04L 9/32* (2006.01)
  *H04L 29/12* (2006.01)
(52) U.S. Cl.
  CPC ........ *H04L 9/3242* (2013.01); *H04L 61/6022* (2013.01); *H04L 63/0876* (2013.01); *H04L 63/101* (2013.01); *H04L 65/1073* (2013.01)
(58) Field of Classification Search
  CPC ............... H04L 9/3242; H04L 61/6022; H04L 65/1073
  See application file for complete search history.

(56) References Cited

U.S. PATENT DOCUMENTS

| | | | | |
|---|---|---|---|---|
| 2007/0162954 | A1* | 7/2007 | Pela | G06F 21/31 726/2 |
| 2009/0070863 | A1* | 3/2009 | Shimizu | H04L 63/0236 726/7 |
| 2009/0083830 | A1* | 3/2009 | Lum | H04L 63/20 726/1 |

OTHER PUBLICATIONS

PacketCable 2.0 Standard, available at <http://www.cablelabs.com/packetcable/specifications/specifications20.html> (visited Dec. 7, 2010).

Network Working Group, Request for Comments 2782, "DNS RR for Specifying the Location of Services", Internet Software Consortium, Feb. 2000.

Network Working Group, Request for Comments 3455, "Private Header (P-Header) Extensions to the Session Initiation Protocol (SIP) for the $3^{rd}$-Generation Partnership Project (3GPP)", Jan. 2003.

Dave Birch, "Soft and Hard SIMs" Article published Dec. 13, 2010 (3 pages) http://tomorrowstransactions.com/2010/12/soft-and-hard-sims/.

A Niemi et al., "RFC 3310: Hypertext Transfer Protocol (HTTP) Digest Authentication Using Authentication and Key Agreement" @2002 The Internet Society (18 pages) http://tools.ietf.org/pdf/rfc3310.pdf.

Mitch Ames et al. Wikipedia article for "UICC", dated Apr. 8, 2010 (2 pages) http://en.wikipedia.org/w/index.php?title=UICC&oldid=354658858.

PacketCable™ 2.0 IMS Delta Specifications 3G security; Access security for IP-based services Specification 3GPP TS 33.203. PKT-SP-33.203.I05-090528 @2006-2009 Cable Television Laboratories Inc. (pp. 1-90) http://www.cablelabs.com/specifications/PKT-SP-33.202-I05-090528.pdf.

J. Rosenberg et al. "RFC 3261: SIP: Session Initiation Protocol" @2002 The Internet Society (269 pages) http://tools.ietf.org/pdf/rfc3261.pdf.

* cited by examiner

PROVISIONING USING A GENERIC CONFIGURATION

CROSS REFERENCE TO RELATED APPLICATIONS

This application is a continuation of U.S. patent application Ser. No. 13/087,597 filed on Apr. 15, 2011, the entire contents of which are incorporated herein by reference.

BACKGROUND

Conventional solutions to providing provisioning information include developing or procuring a provisioning system capable of storing information specific to a device or user, and sending that information to the device in a customized configuration. There are significant costs to deploy a provisioning system capable of performing user or device specific provisioning. These costs would be applicable regardless of whether the system was developed or an off-the-shelf system was used.

SUMMARY

This summary is not intended to identify critical or essential features of the disclosure provided herein, but instead merely summarizes certain features and variations thereof.

In some illustrative embodiments, one or more methods, apparatuses/devices, systems, and/or (transitory and/or non-transitory) computer-readable media may be used to emulate the behavior of a user provisioning system via a generic configuration. The generic configuration might not be specific to a particular user or user equipment device (UED).

In some embodiments, the execution or running of one or more applications (which may be operative on one or more devices, such as a computing device) may provide a UED with an ability to derive settings particular to the UED or a user associated with the UED.

In some embodiments, a first of the applications may be referred to as a Proxy Call Session Control Function (P-CSCF) Discovery application. The P-CSCF Discovery application may be configured to enable a UED to dynamically learn a fully qualified domain name (FQDN) and IP address of a node.

In some embodiments, a second of the applications may be referred to as a registration generation application. The registration generation application may be configured to enable a UED to generate authentication credentials for the UED.

In some embodiments, a third of the applications may be referred to as a port shutdown application. The port shutdown application may be configured to enable a UED to determine which port or ports are authorized for service and which port or ports are not authorized for service.

In some embodiments, a fourth of the applications may be referred to as a learn number application. The learn number application may be configured to enable a UED to determine a number associated with the UED, such as a telephone number.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections arc general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
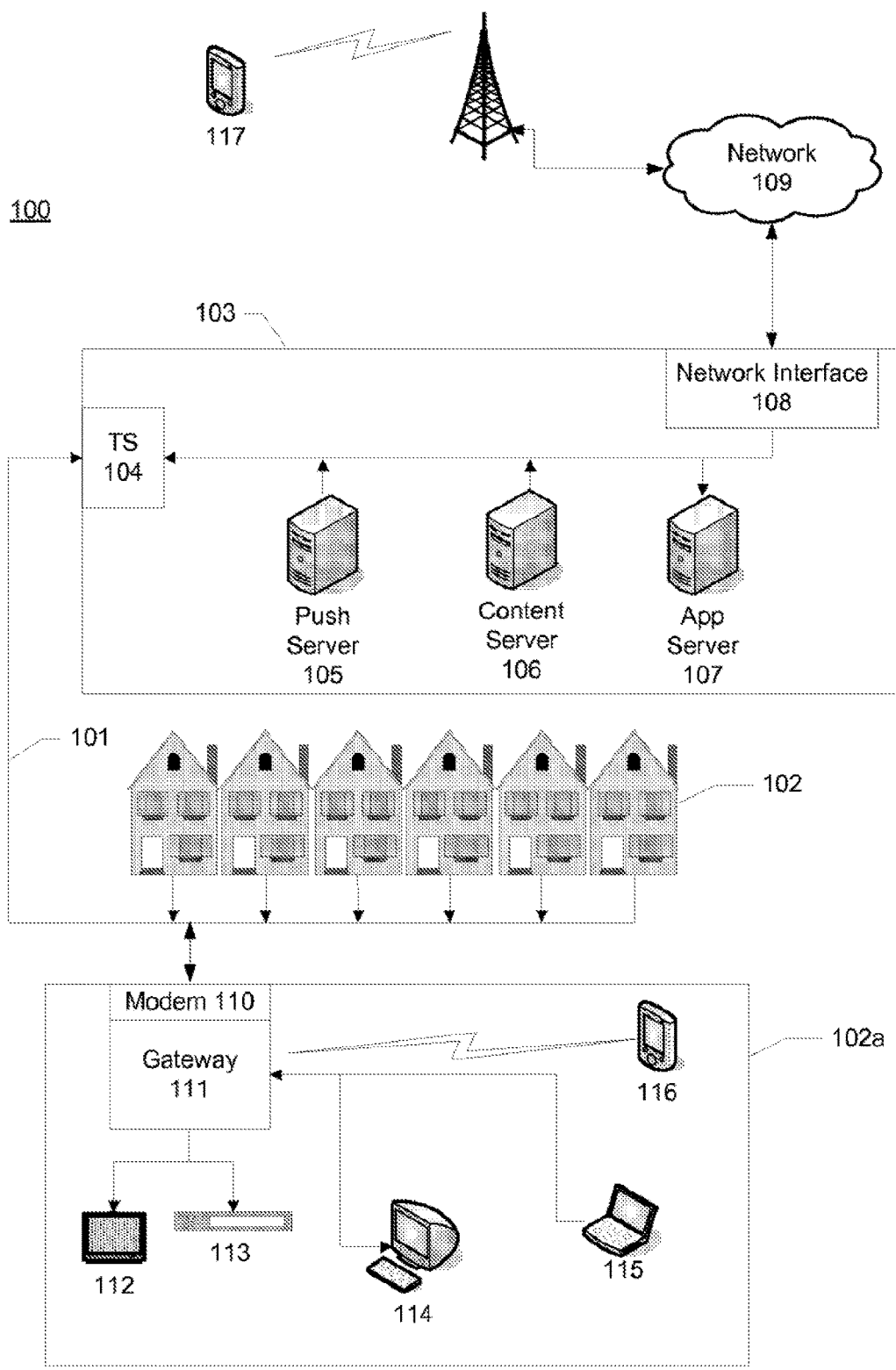
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
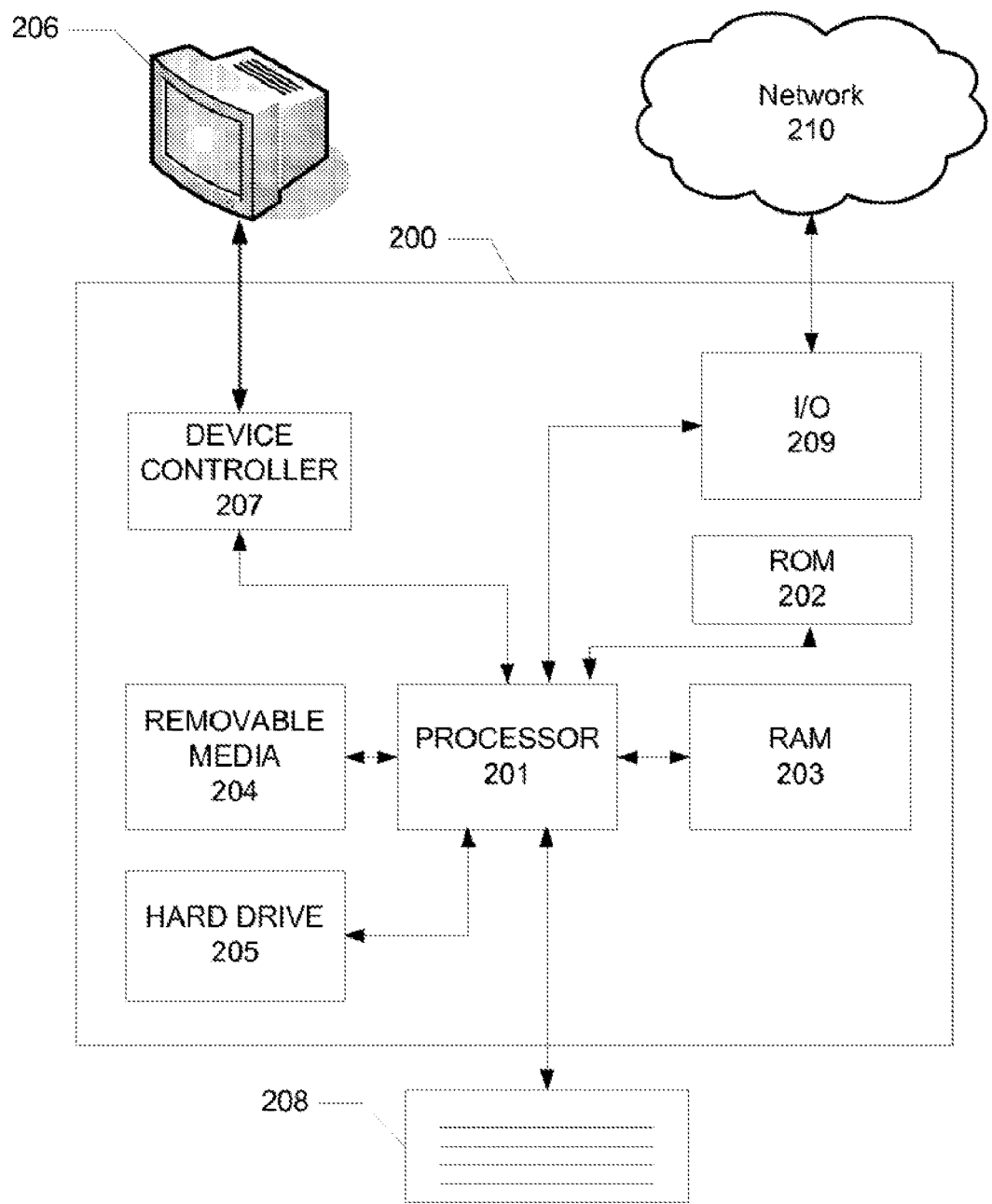
FIGS. 2-3 illustrate example hardware and software platforms on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

By way of introduction, a provisioning of user or device specific information to a user equipment device (UED) may be obtained using a generic, non-user specific configuration.

Figure 3:
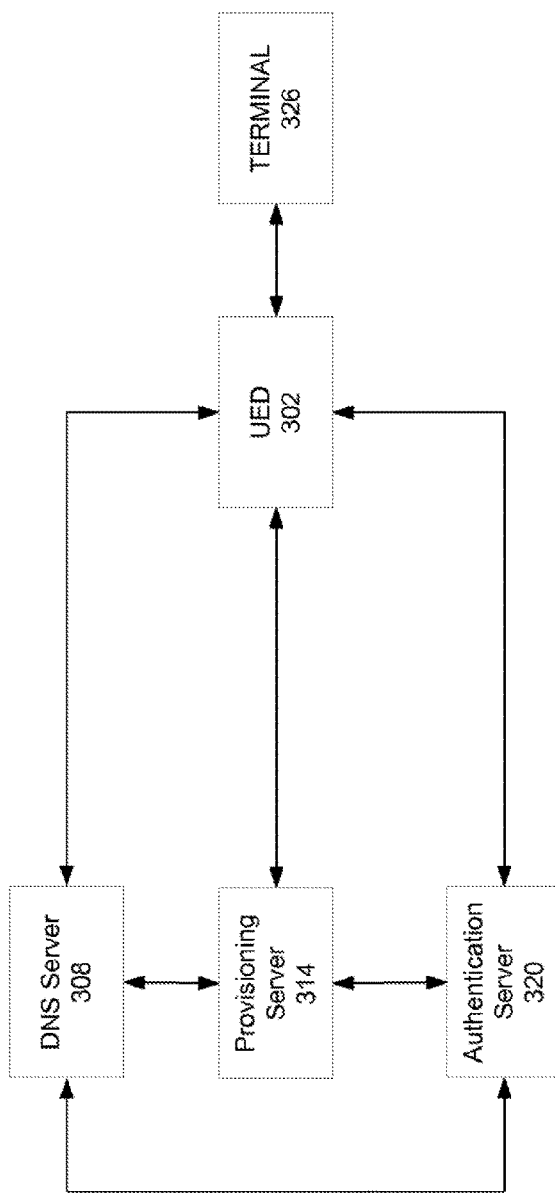

FIG. 3 illustrates an architecture that may be used to facilitate a provisioning of user or device specific information to a user equipment device (UED). In some embodiments, a UED may include one or more of the devices or entities shown in FIGS. 1 and 2.

As shown in FIG. 3, a UED 302 may be coupled to, or communicate with, one or more of a domain name system (DNS) server 308, a provisioning server 314, and an authentication server 320. The servers 308, 314, and 320 may be coupled to and communicate with one another as shown in FIG. 3. UED 302 may also be coupled to, or communicate with, a terminal 326. In some embodiments, terminal 326 may include a communication (e.g., telephone) handset, a display device, etc.

While shown as discrete entities in FIG. 3, in some embodiments one or more of the devices may be combined into a single device or may be located at a common location. For example, in some embodiments, DNS server 308 and provisioning server 314 may be co-located. In some embodiments, one or more of the devices shown in FIG. 3 may be replicated. The replication may be used to provide redundancy or to facilitate load-balancing with respect to the server shown, for example. In some embodiments, there may be any number of UED 302s. In some embodiments, the functionality described below in connection with one or more of the devices may be (re-)distributed to one or more other devices (not necessarily shown in FIG. 3).

In some embodiments, provisioning server 314 may be configured to provide a generic configuration to UED 302.

The generic configuration may be in the form of a file, a data structure, or the like. The generic configuration may include information to facilitate communication between UED 302 and one or more devices. In some embodiments, data included in the generic configuration may facilitate or enable voice or telephony feature settings, such as call waiting, three-way calling, etc. In some embodiments, provisioning server 314 may maintain a table or mapping of a device identifier, such as a device Media Access Control (MAC) address, to an assigned domain name.

In some embodiments, DNS server 308 may be configured to facilitate the execution of a Proxy Call Session Control Function (P-CSCF) Discovery application. In some embodiments, the P-CSCF Discovery application may, for example, be based at least in part on Network Working Group, Request for Comments 2782, "DNS RR For Specifying The Location Of Services", Internet Software Consortium, February 2000.

In some embodiments, the P-CSCF Discovery application may be configured to enable UED 302 to dynamically learn a fully qualified domain name (FQDN) and IP address of a node, such as an IMS P-CSCF node. In some embodiments, DNS SRV queries may be used to facilitate the learning of the FQDN and IP address. For example, in connection with the P-CSCF Discovery application, UED 302 may use a domain name assigned to it during boot-up and perform a DNS SRV query to DNS server 308. The query may take the form_sip._udp.<domain name>. In some embodiments, the <domain name> may be associated with a particular geographic location and may be assigned at or during provisioning. An example of such a domain name may be <ph1.pa.serviceprovider.net>, which may be used in connection with one or more telephony switches (or other resource(s)) located in Philadelphia, Pa.

DNS server 308 (or some other device, such as a database, associated with DNS server 308) may be populated with one or more entries corresponding to given domain names. DNS server 308 may respond to the query with the FQDN and IP address of one or more P-CSCF nodes (e.g., telephony switches) that with which UED 302 should register. In some embodiments, the nodes may be arranged according to one or more priority schemes, and the UED may attempt to register with a node based on the provided priority (e.g., the UED may attempt to register with the highest priority node, and may iteratively seek to register with the next highest priority node should a registration attempt with a higher priority node fail). By allowing UED 302 to learn the P-CSCF information dynamically, a service provider or network operator may be alleviated of the need to enter such information in a user or device specific configuration. In some embodiments, based on the execution of the P-CSCF Discovery application, UED 302 may determine an appropriate resource to register with or use without having to have included such specific information in a configuration.

Authentication server 320 may be configured to facilitate the execution of a registration generation application. Authentication server 320 may be configured to issue a request that challenges UED 302 to provide credentials. Authentication server 320 may be configured to receive a response to the challenge request from UED 302. Authentication server 320 may examine data or information included with the response from UED 302 and may reply to UED 302, authenticating (or denying) service to UED 302 in the process.

In some embodiments, the registration generation application may be configured to enable UED 302 to generate authentication credentials, such as a username (e.g., a SIP username) and password, a personal identification number (PIN), or the like. In some embodiments, the authentication credentials may be based at least in part on information that uniquely identifies UED 302, such as a serial number, a date code (e.g., a manufacturing date code), and/or a Media Access Control (MAC) address of an interface (e.g., telephony interface) associated with UED 302.

In those embodiments where the MAC address is used in the generation of a username, the username may take the form of MACA-XX, where MACA may be the MAC address and XX may be a number (e.g., a two digit hexadecimal number) representing one or more ports associated with UED 302.

In those embodiments where the MAC address is used in the generation of a password, the password may be generated in accordance with an algorithm of the form: password=Base64(HMAC(K, text)$_t$), where 'HMAC' may be a keyed-hash message authentication code based on the National Institute of Standards and Technolgoy Federal Information Processing Standards Publication (NIST FIPS PUB) 198 and 'Base64' may be Base64 text encoding as defined in Network Working Group, Request for Comments 3548, "The Base16, Base32, and Base64 Data Encodings", July 2003 (RFC3548).

In some embodiments, the HMAC algorithm may be based on FIPS PUB 198 and may take the following form: HMAC(K, text)$_t$=H((K$_o$ xor opad)||H(K$_o$ xor ipad)||text))$_t$. The various fields or values in the HMAC algorithm may be defined asset forth in the following paragraphs.

In the HMAC algorithm, 'text' may represent the data in which the HMAC is calculated, and might not include a padded key. Specifically, text may include the hexadecimal digits of the MAC address or the hexadecimal digits of the MAC address plus a port identifier.

In the HMAC algorithm, 'K' may represent a secret key. In some embodiments, K=K$_o$ (where K$_o$ is described further below). In some embodiments, K may be a secret key and may be defined as: K=K$_1$||K$_2$ (where K$_1$, K$_2$, and || are described further below).

In the HMAC algorithm, in some embodiments, K$_o$=K. In some embodiments, K$_o$ may be a 64 byte value.

In the HMAC algorithm, '(K$_1$' may represent a secret key passed or transmitted in a generic configuration to a user equipment device (e.g., UED 302 of FIG. 3). In some embodiments, K$_1$ may be a 32 byte value derived from a 64 digit hexadecimal value.

In the HMAC algorithm, 'K$_2$' may represent a second key embedded in a user equipment device (e.g., UED 302 of FIG. 3). In some embodiments, K$_2$ may be a 32 byte value derived from a 64 digit hexadecimal value.

In the HMAC algorithm, 'ipad' may represent an inner pad. In some embodiments, ipad may be equal to the value 0×36 repeated 64 times.

In the HMAC algorithm, 'opad' may represent an outer pad. In some embodiments, opad may be equal to the value 0×5c repeated 64 times.

In the HMAC algorithm, (the subscript) 't' may be defined as 32.

In the HMAC algorithm, 'H' may represent a hashing algorithm. In some embodiments, the hashing algorithm may correspond to SHA-256, which may produce a 32 byte output value as defined in NIST document FIPS 180-2: Secure Hash Standard (SHS).

In the HMAC algorithm, '||' may represent concatenation, such as bitwise concatenation.

In the HMAC algorithm, 'xor' may represent an exclusive-or operation.

In some embodiments, the output of the HMAC algorithm may produce a 32 byte value, which may be Base64 encoded to produce a 43 character password. Some Base64 implementations may include a '32' character at the end.

Variations may be made to the foregoing equations and algorithms without departing from the spirit of this disclosure. For example, different lengths or numbers of digits may be used in connection with the various values or fields, such as the keys K, $K_1$, and $K_2$. Longer values/fields may have a tendency to promote uniqueness or security, for example.

In some embodiments, a generic configuration that is received at a UED (e.g., UED 302 of FIG. 3) from a server (e.g., provisioning server 314 of FIG. 3) may enable all lines or ports on the UED. In some embodiments, a port shutdown application may be executed to determine which lines or ports are actually authorized for service. For example, the port shutdown application may be configured to enable UED 302 to dynamically learn or determine which of its ports is authorized for service and which of its ports is not authorized for service. In some embodiments, whether a port or line is authorized for service may be determined in accordance with whether the UED was authenticated or denied based on the results of having executed the registration generation application described above. For example, if a UED (e.g., UED 302) is able to successfully respond to a challenge request issued by a server (e.g., authentication server 320) with respect to a given port or line, then that given port or line may be deemed an authorized port or line. Similarly, if the UED is unsuccessful in responding to a challenge request issued by the server with respect to the given port or line, then that given port or line may be deemed to be unauthorized.

The status of whether a port or line is authorized may be reflected in regards to the operation or function of the UED with respect to such port/line. Based on such a determination, UED 302 may be configured to place those port(s) or line(s) that are not authorized for service in a "down" state. The down state may include UED 302 performing one or more of: disabling line voltage, suspending messaging (such as registration messaging), and indicating a down state on a LED indicator for the unauthorized port/line. Thus, execution of the port shutdown application may serve to override the generic configuration having turned on all ports/lines by turning off those ports/lines that are not authorized for service.

In some embodiments, a server (e.g., authentication server 320) may be configured to facilitate execution of a learn number application. The learn number application may be configured to enable a UED (e.g., UED 302) to determine an ID associated with the UED, such as a telephone number. The learning of the number by the UED may be based on information obtained from the server in connection with having engaged in an exchange of messages with the server. Such an exchange of messages may take place in connection with having executed the registration generation application described herein. The learned number may be included in a (subsequent) communication by the UED (e.g., a telephone call initiated by the UED) in order to identify the UED.

In some embodiments, the learn number application may be based at least in part on Network Working Group, Request for Comments 3455, "Private Header (P-Header) Extensions to the Session Initiation Protocol (SIP) for the 3rd-Generation Partnership Project (3GPP)", January 2003.

While the Proxy Call Session Control Function (P-CSCF) Discovery application, the registration generation application, the port shutdown application, and the learn number application were described above as distinct applications, such a distinction was drawn for purposes of illustrative simplicity. In some embodiments, the functionality associated with each of those applications may be structured in any suitable manner. For example, in some embodiments a single application may incorporate all of the functionality associated with the aforementioned applications.

Figure 4:
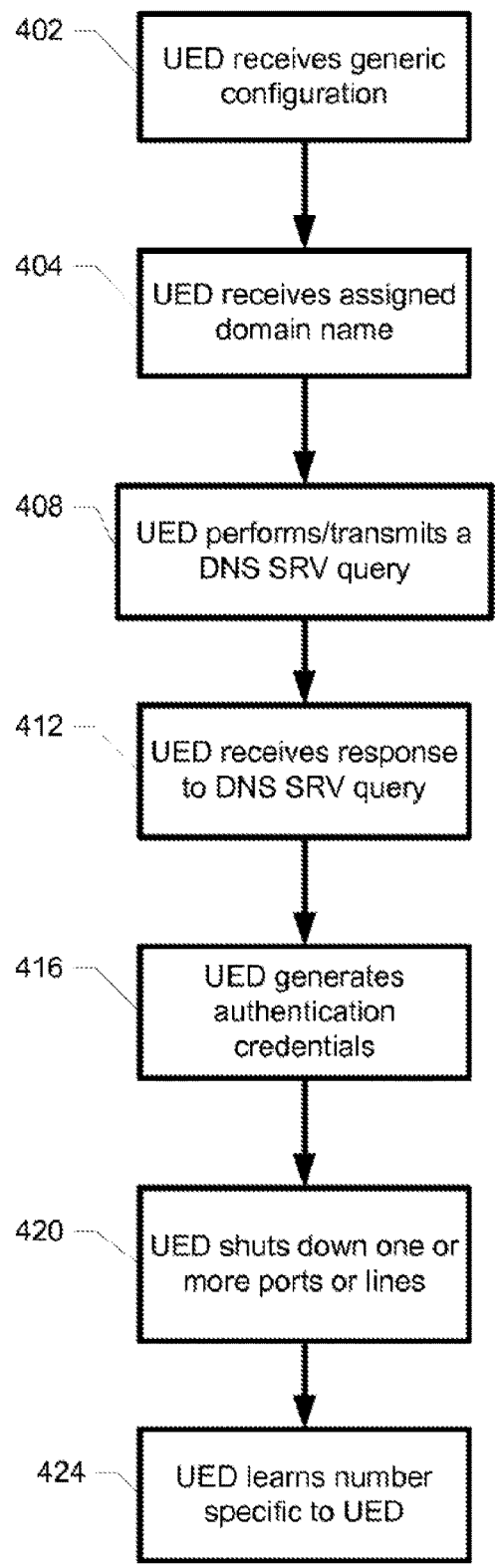
FIG. 4 illustrates a method suitable for demonstrating one or more aspects of this disclosure.

FIG. 4 illustrates a method that may be used in accordance with one or more aspects of this disclosure. The method shown in FIG. 4 is described below in connection with the architecture shown in FIG. 3 for an example implementation, with the understanding that the method may be adapted to accommodate one or more alternative architectures.

In step 402, UED 302 may receive (e.g., from provisioning server 314) a generic configuration, in the form of a file, data structure, or the like.

In step 404, UED 302 may receive an assigned domain name from, for example, DNS server 308. In some embodiments, the domain name may be transmitted to UED 302 through the use of, or in accordance with, Network Working Group, Request for Comments 2131, "Dynamic Host Configuration Protocol", IETF, RFC 2131 or another protocol, standard, or implementation. The domain name may be assigned during a boot-up of UED 302, or at some other point in time.

In step 408, UED 302 may perform a DNS SRV query (e.g., to DNS server 308), based on the assigned domain name received in connection with step 404. In some embodiments, the DNS SRV query may be used to identify one or more hosts on which a service is being hosted in a domain. In some embodiments, step 408 may take place after the generic configuration received in connection with step 402 has been processed.

In step 412, UED 302 may receive a response to the DNS SRV query of step 408 from DNS server 308 or another device. The response may include a FQDN and TP address of a node (e.g., a P-CSCF node) that UED 302 should register with.

In step 416, UED 302 may generate authentication credentials based on information that is unique to UED 302. The authentication credentials may be used by UED 302 to respond to authentication or challenge requests from authentication server 320.

In step 420, UED 302 may engage a shutdown of one or more ports or lines that is not authorized for service. Step 420 may include a determination of whether a port or line is authorized for service based on whether the authentication or challenge requests associated with step 416 were successful.

In step 424, UED 302 may learn a number (such as a telephone number) that is specific to UED 302. The number may be learned by UED 302 based on information included in replies received from authentication server 320 in connection with step 416.

The method described above in connection with FIG. 4 is illustrative. In some embodiments, some of the steps may be optional and the order of some steps may be modified. For example, in some embodiments UED 302 may receive an assigned domain name (step 404) prior to receiving a generic configuration (step 402). In some embodiments, steps not shown may be included. Moreover, while the steps were shown with respect to the UED in FIG. 4, the steps could have been portrayed from the perspective of one or more other devices.

While some examples have been described above in the context of telephone technology and communications, aspects of this disclosure may readily be applied to, and adapted to be operative on, one or more other communication systems. Those communication systems may include computer networks, television networks, satellite networks, cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As described herein, a generic configuration (optionally in the form of a configuration file) may be provided to a UED, and the UED may be configured to dynamically learn or derive information or data specific to the UED. In this manner, a network operator may deploy a network without having to invest in a "per user" or "per user device" provisioning system.

The methodological acts and processes described herein may be tied to particular machines or apparatuses. For example, as described herein, applications may execute on one or more devices, such as servers and user equipment devices. The applications may be formatted in accordance with one or more communication techniques, types, or protocols. More generally, one or more computers may include one or more processors and memory storing instructions, that when executed, perform the methodological acts and processes described herein. Furthermore, the methodological acts and processes described herein may perform a variety of functions including transforming an article (e.g., a user equipment device configured with a generic configuration) into a different state or thing (e.g., a user equipment device provisioned with information or data specific to the user equipment device).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   generating, based at least in part on an identifier associated with a device and an identifier associated with a first communication port of the device, first authentication credentials;
   generating, based at least in part on the identifier associated with the device and an identifier associated with a second communication port of the device, second authentication credentials;
   transmitting, by the device to an authentication server, the first authentication credentials and the second authentication credentials;
   receiving, by the device, first information indicating that the first communication port is not authorized for use based at least in part on the first authentication credentials and second information indicating that the second communication port is authorized for use based at least in part on the second authentication credentials; and
   causing disablement, in response to the first information, of the first communication port.

2. The method of claim 1, further comprising enabling, by the device prior to generating the first authentication credentials and the second authentication credentials, the first communication port and the second communication port.

3. The method of claim 2, further comprising, after receiving the second information, maintaining enablement of the second communication port.

4. The method of claim 1, wherein causing disablement of the first communication port comprises at least one of: disabling a voltage on a communication line associated with the first communication port; suspending messaging associated with the first communication port; and generating a down state at an indicator for the first communication port.

5. The method of claim 1, wherein the first authentication credentials comprise a username formed at least in part from the identifier associated with the first communication port, and wherein the second authentication credentials comprise a username formed at least in part from the identifier associated with the second communication port.

6. The method of claim 5, further comprising receiving a key, and wherein the first authentication credentials further comprise a first password formed at least in part based on the key, and wherein the second authentication credentials further comprise a second password formed at least in part based on the key.

7. The method of claim 1, wherein the identifier associated with the device comprises at least one of:
   a Media Access Control (MAC) address associated with the device,
   a serial number associated with the device, or
   a date code associated with the device.

8. The method of claim 1, further comprising:
   receiving, by the device from a provisioning server, a domain name;
   transmitting, by the device to a domain name system server, a query based at least in part on the domain name; and
   receiving, by the device from the domain name system server, a second domain name and an internet protocol address of a node; and
   communicating with the node.

9. The method of claim 8, wherein the node comprises a Proxy Call Session Control Function (P-CSCF) node.

10. A method comprising:
generating, by a device, a plurality of authentication credentials, respectively, for a plurality of communication ports of the device, wherein each of the authentication credentials of the plurality of authentication credentials is based at least in part on both an identifier associated with the device and an identifier associated with the respective communication port of the plurality of communication ports;
transmitting, by the device to an authentication server, the plurality of authentication credentials;
receiving, by the device, information indicating at least one communication port, of the plurality of communication ports, that is not authorized for use based at least in part on the plurality of authentication credentials; and
causing disablement of the indicated at least one communication port.

11. The method of claim 10, further comprising enabling, by the device prior to generating the plurality of authentication credentials, each communication port of the plurality of communication ports.

12. The method of claim 11, further comprising, after receiving information indicating at least a second communication port of the plurality of communication ports is authorized for use, maintaining enablement of the indicated at least a second communication port.

13. The method of claim 10, wherein causing disablement of the indicated at least one communication port comprises at least one of: disabling a voltage on a communication line associated with the at least one communication port; suspending messaging associated with the at least one communication port; and generating a down state at an indicator for the at least one communication port.

14. The method of claim 10, wherein each of the authentication credentials of the plurality of authentication credentials comprises a unique username formed at least in part from the identifier associated with the respective communication port of the plurality of communication ports.

15. The method of claim 14, further comprising receiving a key, and wherein each of the authentication credentials of the plurality of authentication credentials further comprises a unique password formed at least in part based on the key.

16. The method of claim 10, wherein the identifier associated with the device comprises at least one of:

a Media Access Control (MAC) address associated with the device,
a serial number associated with the device, or
a date code associated with the device.

17. A device comprising:
a processor; and
a memory storing computer executable instructions that, when executed by the processor, cause the device to:
generate a plurality of authentication credentials, respectively, for a plurality of communication ports of the device, wherein each of the authentication credentials of the plurality of authentication credentials is based at least in part on both an identifier associated with the device and an identifier associated with the respective communication port of the plurality of communication ports;
transmit, to an authentication server, the plurality of authentication credentials;
receive information indicating at least one communication port, of the plurality of communication ports, that is not authorized for use based at least in part on the plurality of authentication credentials; and
causing disablement of the indicated at least one communication port.

18. The device of claim 17, wherein the memory further stores computer executable instructions that, when executed by the processor, cause the device to enable, prior to generating the plurality of authentication credentials, each communication port of the plurality of communication ports.

19. The device of claim 18, wherein the memory further stores computer executable instructions that, when executed by the processor, cause the device, in response to information indicating at least a second communication port of the plurality of communication ports that is authorized for use, to maintain enablement of the indicated at least a second communication port.

20. The device of claim 17, wherein causing disablement of the indicated at least one communication port comprises at least one of: disabling a voltage on a communication line associated with the at least one communication port; suspending messaging associated with the at least one communication port; and generating a down state at an indicator for the at least one communication port.

* * * * *